United States Patent Office 2,760,846
Patented Aug. 28, 1956

2,760,846

PROCESS FOR THE MANUFACTURE OF TITANIUM DIOXIDE

James Thomson Richmond and Howard A. S. Bristow, Luton, England, assignors to Laporte Titanium Limited, Luton, England No Drawing. Application June 17, 1955, Serial No. 516,307

Claims priority, application Great Britain June 18, 1954

6 Claims. (Cl. 23—202)

Processes for the manufacture of titanium dioxide are known, in which titanium tetrachloride vapour is reacted with oxygen or a gas containing oxygen at a temperature within the range of about 800° C. to 1200° C. If the extremely finely divided titanium dioxide is allowed to deposit on the walls of the reaction vessel immediately it is formed, the product so deposited undergoes crystal growth, and this is not desired. In order to avoid this phenomenon it is known to bring about the reaction rapidly at a high temperature in a small zone, for example, a flame, which is sufficiently remote from the walls of the reaction vessel to prevent the immediate deposition of the titanium dioxide formed. Alternatively or in addition, a current of an inert gas may be introduced into the vessel so as to carry away the titanium dioxide as it is formed.

The present invention provides an improved process for the manufacture of titanium dioxide by the oxidation of a titanium tetrahalide in the vapour phase, wherein the reaction between the tetrahalide vapour and oxygen or a gas containing oxygen is carried out within a bed of solid particles maintained in a fluidised condition at a temperature within the range of 750° C. to 1250° C., and the whole or the greater part of the titanium dioxide formed is carried away with the gases leaving the fluidised bed.

The term "titanium tetrahalide" is used herein to denote the tetrachloride, tetrabromide and tetraiodide, and excludes the tetrafluoride.

Owing to the fact that the reaction is carried out within the turbulent bed of fluidised particles, the need for special measures to prevent the deposition of the titanium dioxide immediately it is formed does not arise.

It will be understood that the rate of flow of the mixture of vapour and gas and the size of the particles must be so related in known manner, taking into account the size and shape of the reaction vessel, that the particles are maintained in the fluidised condition by the fluid stream. A convenient particle size is from 0.001 to 0.1 inch depending on the rate of flow of the fluid through the bed.

In the present process it is preferable to use a purified titanium tetrahalide containing less than 0.1 per cent of each of vanadium, iron and chromium calculated as $V_2O_5$, $Fe_2O_3$ and $Cr_2O_3$ respectively. In this manner titanium dioxide of high purity is obtained such as is especially suitable as a pigment or for use in vitreous enamels, optical glass, glazes and ceramics. To produce a titanium dioxide suitable for the production of metallic titanium or electroceramics the purified titanium tetrahalide should also contain less than 0.2 per cent of each of aluminium and silicon calculated as $Al_2O_3$ and $SiO_2$, respectively.

The fluidised particles may be composed of any suitable solid heat-resistant material, which may be inert or may catalyse the reaction. As examples there may be mentioned alumina and silica. It is, however, advantageous to use particles of titanium dioxide, which may be used alone or in admixture with particles of another material.

The titanium dioxide, which is carried away with the gases leaving the fluidised bed, may be separated from the gases in any suitable manner, for example, by means of a cyclone separator.

The conditions can be adjusted in known manner so that the titanium dioxide carried away with the gases is of a very fine particle size such as is desired in a titanium dioxide pigment, or is of a coarser particle size such as is suitable for titanium dioxide which is to be used for other purposes, such as in vitreous enamels, glazes and ceramics.

When a part of the titanium dioxide formed remains in the fluidised bed, it is of advantage to use titanium dioxide particles as the fluidised particles, because it may then be unnecessary subsequently to separate the titanium dioxide formed from the fluidised particles. If, however, the latter particles are of larger size than the titanium dioxide particles formed, the latter can be separated, for example, by sieving. When the fluidised particles are composed of another material, which it is not desired to retain in association with the titanium dioxide, they should possess some property, for example, a particle size, density or solubility, enabling them to be separated from the titanium dioxide.

The reaction can be initiated in the fluidised bed by supplying heat thereto by external or internal heating. Internal heating may be brought about by burning a combustible gas or liquid fuel, for example, carbon monoxide or gas oil, in the bed, or by separately introducing the tetrahalide vapour and the oxygen or oxygen-containing gas preheated to a temperature sufficient to initiate the reaction in the fluidised bed. Since the reaction is exothermic it is only necessary, once the reaction has commenced, to abstract or supply heat at the rate necessary to maintain the bed at the desired temperaure. When it is necessary to supply heat, this may be done by introducing a combustible gas, advantageously carbon monoxide, or a liquid fuel together with the oxygen or gas containing oxygen.

The reaction can be accelerated by carrying it out in the presence of a small proportion of water vapour, which may be introduced into the fluidised bed as such or in the form of a substance capable of yielding water vapour at the temperature prevailing in the fluidised bed.

If desired, titanium dioxide containing a small proportion of a compound of another metal or of a non-metal, for example, as a conditioning agent, may be produced by incorporating the vapour of a halide of such metal or non-metal with the titanium tetrahalide vapour. Thus, for example, aluminium chloride or silicon chloride may be added to produce titanium dioxide containing aluminium oxide or silica. The vapour of a substance capable of promoting the formation of rutile may also be added to the titanium tetrahalide vapour, for example, titanium trichloride. Aluminium chloride previously referred to also acts as a rutile promoter.

Owing to the fact that the process of this invention avoids the need to introduce diluent gases, it is possible to work with a high concentration of oxygen, so that a high content of chlorine or other halogen can be attained in the gases resulting from the reaction such that the gases can be used directly for the production of titanium tetrachloride or other tetrahalide, for example, by reacting a titanium-bearing ore with carbon and a halogen.

By suitably controlling the conditions of the oxidation, for example, the temperature and detention time, or by introducing a rutile promoter, it is possible by the process of this invention to produce titanium dioxide substantially wholly in the rutile form.

The following example illustrates the invention:

A purified titanium tetrachloride was used which contained less than 0.0005% of vanadium (as $V_2O_5$), 0.0003% of iron (as $Fe_2O_3$), 0.000004% of chromium (as $Cr_2O_3$), less than 0.1% of silicon (as $SiO_2$) and 0.07% of aluminium (as $Al_2O_3$). The vapour of the titanium tetrachloride and oxygen were passed upwardly through a bed of titanium dioxide particles having a particle size of 40–60 mesh I. M. M. so as to maintain the particles in the fluidised condition. The particles were contained in a silica tube having an internal diameter of 5.1 centimetres, and the height of the fluidised bed was 16 centimetres. The fluidised bed was maintained at a temperature of 1000° C. by external heating. The gas-vapour mixture was passed through the fluidised bed at the rate of 3.3 litres per minute of oxygen and 13.5 cc. per minute of titanium tetrachloride (measured as liquid). Complete reaction occurred in the bed, and the gases leaving the bed contained 94 per cent of chlorine and 6 per cent of oxygen, and were free from titanium tetrachloride. The greater part of the titanium dioxide formed was carried away with the gases leaving the fluidised bed, and was subsequently separated from the gases by means of a cyclone separator. Only about 25 per cent of the titanium dioxide formed remained in the fluidised bed. The titanium dioxide separated from the gases had an average particle size of 0.21 micron, 41 per cent of it was in the rutile form, and it had a tinting strength of 1300 as measured by the Reynolds scale.

By incorporating with the titanium tetrachloride vapour the vapour aluminium chloride or of titanium trichloride, both the content of rutile and the tinting strength of the titanium dioxide obtained are increased.

We claim:

1. A process for the manufacture of titanium dioxide by the oxidation in the vapour phase of a tetrahalide selected from the group consisting of the tetrachloride, tetrabromide and tetraiodide of titanium, wherein the tetrahalide vapour is reacted with gaseous oxygen within a bed of solid particles selected from the group consisting of particles or silica, alumina and titanium dioxide and maintained in a fluidised condition at a temperature within the range of 750° C. to 1250° C., and at least the greater part of the titanium dioxide formed is carried away with the gases leaving the fluidised bed.

2. A process for the manufacture of titanium dioxide by the oxidation in the vapour phase of a tetrahalide selected from the group consisting of the tetrachloride, tetrabromide and tetraiodide of titanium, wherein the vapour of the tetrahalide, which has been purified to contain less than 0.1 per cent of each of vanadium, iron and chromium calculated as $V_2O_5$, $Fe_2O_3$ and $Cr_2O_3$, respectively, is reacted with gaseous oxygen within a bed of solid particles selected from the group consisting of particles of silica, alumina and titanium dioxide and maintained in a fluidised condition at a temperature within the range of 750° C. to 1250° C., and at least the greater part of the titanium dioxide formed is carried away with the gases leaving the fluidised bed.

3. A process for the manufacture of titanium dioxide by the oxidation in the vapour phase of a tetrahalide selected from the group consisting of the tetrachloride, tetrabromide and tetraiodide of titanium, wherein the tetrahalide vapour is reacted with gaseous oxygen in the presence of water vapour as a reaction accelerator within a bed of solid particles selected from the group consisting of particles of silica, alumina and titanium dioxide and maintained in a fluidised condition at a temperature within the range of 750° to 1250° C., and at least the greater part of the titanium dioxide formed is carried away with the gases leaving the fluidised bed.

4. A process for the manufacture of titanium dioxide by the oxidation in the vapour phase of a tetrahalide selected from the group consisting of the tetrachloride, tetrabromide and tetraiodide of titanium, wherein the tetrahalide vapour is reacted with gaseous oxygen within a bed of titanium dioxide particles maintained in a fluidised condition at a temperature within the range of 750° C. to 1250° C., and at least the greater part of the titanium dioxide formed is carried away with the gases leaving the fluidised bed.

5. A process as claimed in claim 1, wherein heat required to maintain the fluidised bed at the reaction temperature is supplied by burning a combustible fluid therein.

6. A process for the manufacture of titanium dioxide by the oxidation in the vapor phase of a tetrahalide selected from the group consisting of the tetrachloride, tetrabromide and tetraiodide of titanium, wherein the tetrahalide vapor is reacted with gaseous oxygen in the presence of a rutile-promoting substance selected from the group consisting of titanium trichloride and aluminium chloride within a bed of solid particles selected from the group consisting of particles of silica, alumina and titanium dioxide and maintained in a fluidised condition at a temperature within the range of 750° C.–1250° C., and at least the greater part of the titanium dioxide formed is carried away with the gases leaving the fluidized bed.

References Cited in the file of this patent

UNITED STATES PATENTS 2,347,496     Muskat et al.             Apr. 25, 1944

OTHER REFERENCES

Kalboch's article in Chem. & Met. Eng., June 1944, pages 94–98.

Kidoo's article in May 1949 Chem. Eng., pages 112–114.

Kalboch's article in January 1947 Chem. Eng., pages 105–108.